(12) United States Patent
Park (10) Patent No.: US 12,365,358 B2
(45) Date of Patent: Jul. 22, 2025

(54) STEERING WHEEL HANDS-ON/OFF DETECTION DEVICE AND METHOD THEREOF

(71) Applicants: HYUNDAI MOTOR COMPANY, Seoul (KR); KIA CORPORATION, Seoul (KR)

(72) Inventor: Joon-Sang Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 141 days.

(21) Appl. No.: 18/376,709

(22) Filed: Oct. 4, 2023

(65) Prior Publication Data
US 2024/0199062 A1    Jun. 20, 2024

(30) Foreign Application Priority Data
Dec. 16, 2022    (KR) .......................... 10-2022-0177326

(51) Int. Cl.
*B60W 50/16*    (2020.01)
*B60W 40/08*    (2012.01)

(52) U.S. Cl.
CPC ............ *B60W 50/16* (2013.01); *B60W 40/08* (2013.01); *B60W 2040/0818* (2013.01)

(58) Field of Classification Search
CPC .................. B60W 50/16; B60W 50/08; B60W 50/0098; B60W 40/08; B60W 40/09; B60W 40/10; B60W 2040/0818; B60W 2040/0881; B60W 2050/0029; B60W 2050/0013; B60W 2540/18;
(Continued)

(56) References Cited

U.S. PATENT DOCUMENTS 11,628,874 B2    4/2023 Tardy-tuch et al.
11,643,117 B2    5/2023 Kang
(Continued)

FOREIGN PATENT DOCUMENTS

JP    2004518461 A * 6/2004 ............ B60W 50/14
KR    20210070117 A    6/2021
(Continued)

*Primary Examiner* — Hai H Huynh
(74) *Attorney, Agent, or Firm* — Lempia Summerfield Katz LLC (57) ABSTRACT

A steering wheel hands-on/off detection device includes: an imaging part provided in a vehicle and configured to capture a motion of a driver; a dynamic sensor configured to measure a dynamics motion of the vehicle; an image processor configured to process an image obtained from the imaging part; and a vehicle safety controller. The image processor includes a driver monitoring part configured to derive a behavior type of the driver from the image and a keypoint extraction part configured to extract keypoints of the driver. An optimal torque and an optimal contact force are applied to the keypoints of the driver so that a driver dynamics model optimally controlled to follow a position of the driver is applied. The vehicle safety controller configured to determine steering wheel hands-on/off on the basis of a magnitude of a force applied to the steering wheel, which is estimated from the driver dynamics model.

13 Claims, 4 Drawing Sheets

(58) Field of Classification Search
CPC ...... B60W 2540/223; B60W 2540/227; G06V 20/597; B60N 2/0272
USPC ........................................ 701/41, 42, 43, 44
See application file for complete search history.

(56) References Cited

U.S. PATENT DOCUMENTS

2020/0353970 A1   11/2020   Tardy-tuch et al.
2021/0171067 A1   6/2021    Kang

FOREIGN PATENT DOCUMENTS

KR          102345191 B1    12/2021
KR          20220108555 A   8/2022

\* cited by examiner

STEERING WHEEL HANDS-ON/OFF DETECTION DEVICE AND METHOD THEREOF

CROSS-REFERENCE(S) TO RELATED APPLICATIONS

This application claims priority to Korean Patent Application No. 10-2022-0177326, filed on Dec. 16, 2022, which is incorporated herein by reference in its entirety.

BACKGROUND OF THE DISCLOSURE

Technical Field

Embodiments of the present disclosure relate to a steering wheel hands-on/off detection device and method, which use a camera and a dynamic sensor in order to determine steering wheel hands-on/off without using a contact sensor and which detects the steering wheel hands-on/off through inference from motion dynamics.

Description of Related Art

When a torque variance detected by a torque sensor is within a predetermined torque variance range, it is difficult for the conventional hands-on/off detection system to determine a hands-off condition. Thus, hands-on/off is often determined by a touch sensor. A steering wheel hands-on/off detection device employs a method of recognizing steering wheel hands-on/off through frequency/phase differences measured by the torque sensor according to whether a driver's hands and a steering wheel are in contact. This has a limitation that some drivers can deceive the system by putting a weight on a steering wheel for convenience. A driver's motion can be recognized to determine that the driver is holding the steering wheel when a position of the driver's hand is in the vicinity of the steering wheel. However, even when the driver's hand is in the vicinity of the steering wheel, there may be a case in which the driver is not actually holding the steering wheel. Further, in the case of using a vehicle interior camera, when the steering wheel is not present in a field of view (FOV) of the camera, there is a disadvantage in that the driver's hand cannot be detected reliably.

Recently, hands-on/off detection without using a contact sensor can be determined using a motion (torque) of the steering wheel. To this end, there is a limit for requiring an input of a predetermined level or more. Thus, false detection may occur in a straight driving section for a short period of time.

SUMMARY OF THE DISCLOSURE

Embodiments of the present disclosure are directed to a steering wheel hands-on/off detection device and a method thereof. The method and device detect steering wheel hands-on/off through inference from motion dynamics using a vehicle interior imaging part and a vehicle internal information sensor without using a contact sensor.

Other objects and advantages of the present disclosure can be understood by the following description and should become apparent with reference to the embodiments of the present disclosure. Also, it should be apparent to those of ordinary skill in the art to which the present disclosure pertains that the objects and advantages of the present disclosure can be realized by the devices and methods as claimed and by combinations thereof.

In accordance with an embodiment of the present disclosure, a steering wheel hands-on/off detection device is provided. The detection device includes: an imaging part provided in a vehicle and configured to capture a motion of a driver; a dynamic sensor configured to measure a dynamic motion of the vehicle; and an image processor configured to process an image obtained from the imaging part. The image processor includes a driver monitoring part configured to derive a behavior type of the driver from the image. The image processor also includes a keypoint extraction part configured to extract keypoints of the driver, wherein an optimal torque and an optimal contact force are applied to the keypoints of the driver so that a driver dynamics model is applied and optimally controlled to follow a position of the driver. The detection device also includes a vehicle safety controller configured to determine steering wheel hands-on/off based on a magnitude of a force applied to the steering wheel. The applied force is estimated from the driver dynamics model.

In accordance with another embodiment of the present disclosure, a steering wheel hands-on/off detection device is provided. The detection device includes: an imaging part provided in a vehicle and configured to capture a motion of a driver; a dynamic sensor configured to measure a dynamic motion of the vehicle; and an image processor configured to process an image obtained from the imaging part. The image processor includes a driver monitoring part configured to derive a behavior type of the driver from the image and includes a keypoint extraction part configured to extract keypoints of the driver. The detection device also includes a vehicle safety controller configured to determine steering wheel hands-on/off from a driver dynamics model, which is set from a behavior type and the key points of the driver.

In accordance with still another embodiment of the present disclosure, a steering wheel hands-on/off detection device is provided. The detection device includes: an imaging part provided in a vehicle and configured to capture a motion of a driver; a dynamic sensor configured to measure a dynamic motion of the vehicle; and an image processor configured to process an image obtained from the imaging part. The image processor includes a driver monitoring part configured to derive a behavior type of the driver from the image and includes a keypoint extraction part configured to extract keypoints of the driver. The detection device also includes a vehicle safety the controller configured to determine steering wheel hands-on/off by predicting a motion of the driver through optimal control to allow a driver dynamics model, which is set from the behavior type and the keypoints of the driver, to follow a position of the driver.

In accordance with yet another embodiment of the present disclosure, a method of detecting a steering wheel hands-on/off is provided. The method includes: extracting, by an image processor, a behavior type and keypoint coordinates of a driver from an image acquired from an imaging part in a vehicle; determining whether the driver has a behavior type capable of holding a steering wheel; determining whether a driver's hand is within a predetermined distance from the steering wheel; adding a steering wheel contact condition to a constraint condition of a driver dynamics model of a vehicle safety controller; estimating a force applied to the steering wheel from the driver dynamics model through optimal control; and determining steering wheel hands-on/off by predicting a motion of the driver through optimal control to allow the driver dynamics model, which is set from the behavior type and the keypoints of the driver, to follow a position of the driver.

BRIEF DESCRIPTION OF THE DRAWINGS

The above and other objects, features, and advantages of the present disclosure will should be more apparent from the following detailed description taken in conjunction with the accompanying drawings.

DESCRIPTION OF SPECIFIC EMBODIMENTS

Hereinafter, some embodiments of the present disclosure are described in detail with reference to the drawings. In adding the reference numerals to the components of each drawing, it should be noted that the identical or equivalent components are designated by the identical numeral even when the components are displayed on other drawings. Further, in describing the embodiments of the present disclosure, a detailed description of the related known configuration or function has been omitted where it has been determined that the detailed description would have interfered with the understanding of the embodiments of the present disclosure.

Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. The terms should not be interpreted in an idealized or overly formal sense unless expressly so defined herein.

When a component, device, element, or the like of the present disclosure is described as having a purpose or performing an operation, function, or the like, the component, device, element, or the like should be considered herein as being "configured to" meet that purpose or to perform that operation or function. Also, component, device, element, and the like may separately embody or be included with a processor and a memory, such as a non-transitory computer readable media, as a part thereof.

Figure 1:
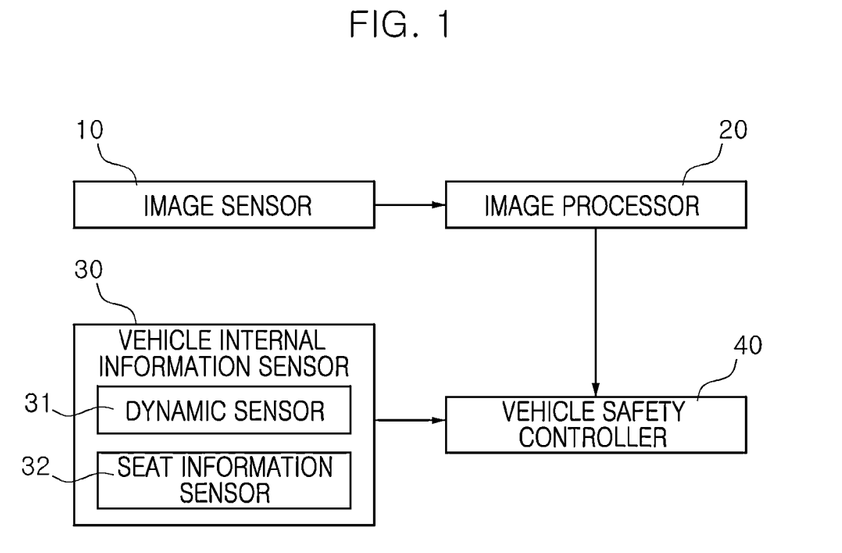
FIG. 1 is a block diagram illustrating the entire system of the present disclosure.

FIG. 1 is a block diagram illustrating the entire system of the present disclosure. According to the present disclosure, a vehicle interior camera 10 and a vehicle internal information sensor 30 are used to detect steering wheel hands-on/off of a driver through inference from motion dynamics without using a contact sensor. As used herein, steering wheel hands-on/off means whether a driver's hands are on, i.e., in contact with (hands-on) the steering wheel or are off, i.e., not in contact with (hands-off) the steering wheel of the driver's vehicle.

A device capable of motion capture, such as the vehicle interior camera 10, detects and captures a hands-on/off motion of the driver toward the steering wheel. An image processor 20 processes the captured image, determines a behavior type of the driver through driver monitoring, and extracts keypoint information of the driver through deep learning, such as a convolutional neural network (CNN) or a computer vision technique.

The vehicle internal information sensor 30 may be a dynamic sensor 31 and may selectively include a seat sensor assembly 32. The dynamic sensor 31 may be an acceleration sensor and may selectively include a yaw rate sensor. The seat sensor assembly 32 may selectively include a seat position sensor, a seat incline sensor, and/or a seat swivel sensor.

A vehicle safety controller 40 is installed in a vehicle and estimates a torque and a contact force (applied by the driver's hands to the steering wheel) at joints of a driver dynamics model necessary to follow three-dimensional coordinates of keypoints of the driver, which are estimated from the image processor 20. In this case, the driver dynamics model is updated using the seat sensor assembly 32 and an inertial force applied to the driver is calculated using the dynamic sensor 31. Finally, the steering wheel hands-on/off is determined using a contact force applied by the driver's hands to the steering wheel. Meanwhile, the image processor 20 and the vehicle safety controller 40 may be configured as one electronic control unit (ECU) or a separate ECU.

Figure 2:
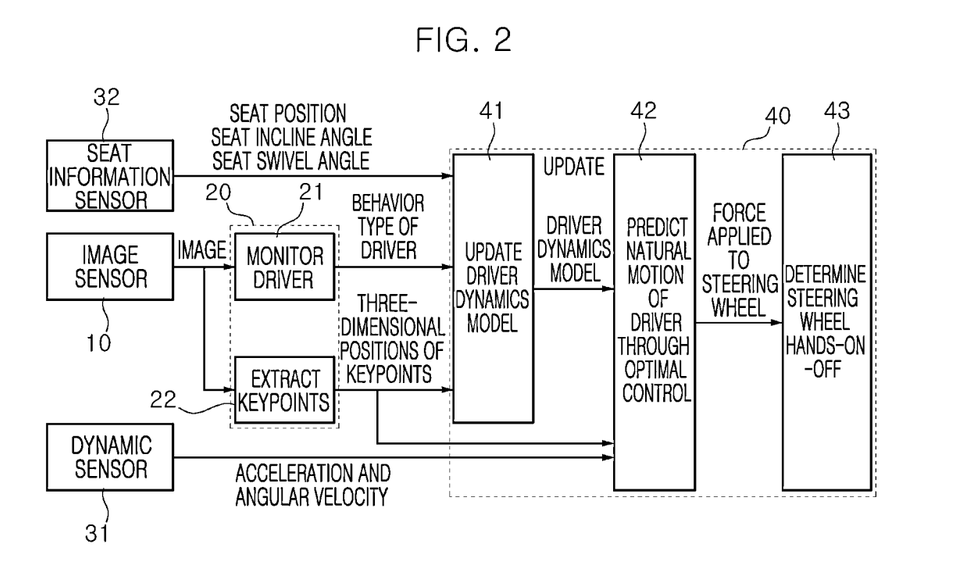
FIG. 2 is a diagram illustrating a flow of information in the entire system of the present disclosure.

FIG. 2 is a diagram illustrating a flow of information in the entire system of the present disclosure. The present disclosure relates to a system that detects steering wheel hands-on/off through inference from motion dynamics using the camera 10, which is a vehicle interior imaging part, and the vehicle internal information sensor 30 without using a contact sensor. FIG. 2 shows information flow between sensors and software (SW) components, which constitute the system.

A driver monitoring part 21 determines a behavior type of the driver by applying deep learning, such as a CNN, or a computer vision technique to an image received from the camera 10.

A keypoint extraction part 22 extracts keypoints of the driver by applying the deep learning, such as a CNN, or the computer vision technique to the image received from the camera 10. The key points of the driver may include the head, neck, shoulder, elbow, wrist, and pelvis and include three-dimensional position information.

A driver dynamics model update part 41 may update the driver dynamics model using seat information received from the seat sensor assembly 32 (e.g., a seat position, a seat incline angle, and a seat swivel angle), the behavior type of the driver received from the driver monitoring part 21 (e.g., driving, talking, and reading), and the three-dimensional position information on the keypoints delivered from the keypoint extraction part 22.

Updatable information includes contact information between the driver and the steering wheel, contact information between the driver and a seat, and a hands-on/off determination possible state.

In order to follow a three-dimensional position of a natural motion of the driver, which is measured from the camera 10, through optimal control, a motion prediction part 42 calculates a torque and a contact force which should be applied to a joint controlling the driver dynamics model. Here, the contact force may be an external force applied to the driver in contact with an inside of the vehicle and includes a force generated when the driver holds the steering wheel. A quadratic function including a convex quadratic form of an input torque and the contact force, which are applied to the joint, is estimated to be minimized.

A steering wheel hands-on/off determination part 43 finally determines whether the driver's hands hold the steering wheel by determining whether the force applied to the steering wheel by the driver's hands exceeds a specific threshold.

Figure 3:
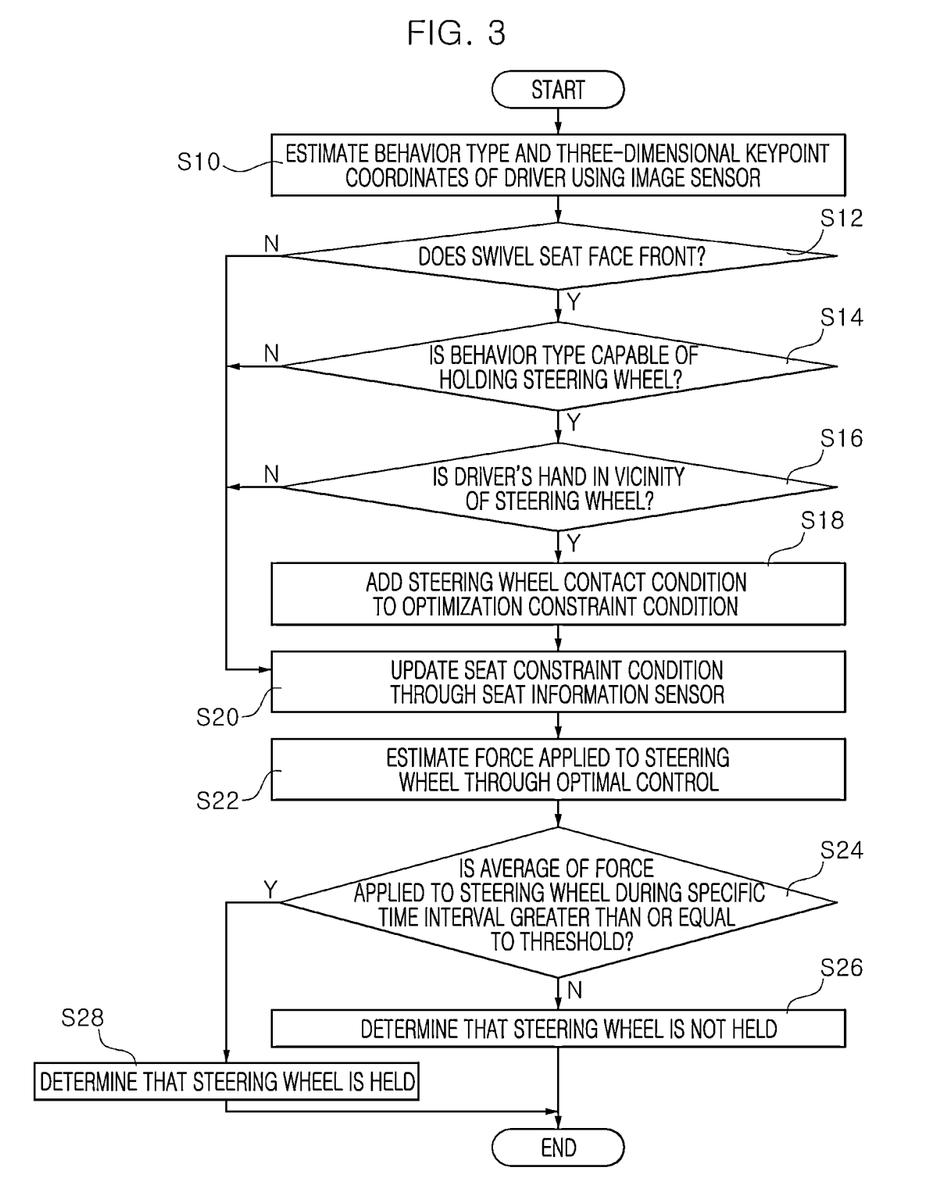
FIG. 3 is a flow chart illustrating an operating mechanism of the present disclosure.

FIG. 3 is a flow chart illustrating an operating mechanism and method of operation.

First, in operation S10, the image processor 20 estimates three-dimensional coordinates of the keypoints of the driver on the basis of the image from the camera 10 installed in the vehicle. The driver monitoring part 21 determines the behavior type of the driver from the system.

In operation S12, in the case of a vehicle type equipped with a swivel seat, it is determined that the steering wheel may be held normally only when the swivel seat faces the front.

In other words, in operation S12, when the swivel seat does not face the front, since the driver cannot hold the steering wheel normally, the steering wheel contact state is not updated. As an example, only when the swivel angle is zero degree is the steering wheel contact state updated.

In addition, in a state in which it is possible to determine one hand-off (calling, texting, drinking, smoking, or the like in Table 1) in operations S14, S16, and S18, when the driver monitoring system is capable of distinguishing with which hand the action is taken, a non-action hand is updated. When the distinction is impossible, a hand of both hands of the driver determined to be closer to the steering wheel is updated.

TABLE 1

| | | HAND NEAR STEERING WHEEL | | |
| --- | --- | --- | --- | --- |
| | | NONE | ONE HAND | BOTH HANDS |
| BEHAVIOR TYPE | DRIVING | BOTH HANDS-OFF | ONE HAND-OFF | HANDS-ON |
| | CALLING | BOTH HANDS-OFF | ONE HAND-OFF | ONE HAND-OFF |
| | TEXTING | BOTH HANDS-OFF | ONE HAND-OFF | ONE HAND-OFF |
| | DRINKING | BOTH HANDS-OFF | ONE HAND-OFF | ONE HAND-OFF |
| | READING BOOK/ NEWSPAPER NOTEBOOK | BOTH HANDS-OFF BOTH HANDS-OFF | BOTH HANDS-OFF BOTH HANDS-OFF | BOTH HANDS-OFF BOTH HANDS-OFF |
| | SMOKING | BOTH HANDS-OFF | ONE HAND-OFF | ONE HAND-OFF |

In operation S14, it is determined whether the behavior type allows the driver to hold the steering wheel normally. For example, in the case in which a drink is held by the driver's hand while drinking or a mobile phone is held by the driver's hand while making a call, the steering wheel cannot be held normally.

In operation S16, when the driver's hands are in the vicinity of the steering wheel, it is determined that the driver's hands may hold the steering wheel. A decision threshold depends on estimation performance of keypoint three-dimensional coordinates of an image controller, such as the image processor 20, and an angle of view of the camera 10.

The operating mechanism of the present disclosure should include at least one of both of operations S14 and S16.

In operation S18, a steering wheel contact condition may be added to the dynamics model applied in operations S14 and S16. In operation S20, a seat constraint condition may be updated to the dynamics model through the seat sensor assembly 32.

In other words, a contact range of a body part of the driver with the seat may be updated in the dynamics model through a position, a swivel angle, and/or an incline angle of the seat, which are acquired from the seat sensor assembly 32.

The seat applies a force by distinguishing the head, torso, and hip of the driver, the force is in the form of a resultant force of a normal force (N) and a frictional force, and a direction of the normal force may be updated through the incline angle of the seat.

Meanwhile, a steering wheel contact state is updated only in a condition in which the driver is capable of holding the steering wheel.

Table 1 shows examples of determination possible conditions for each behavior type and each hand position of the driver Since the behavior type of the driver is determined when the driver takes an action, it is effective in determining whether the driver is capable of holding the steering wheel. For example, when the driver holds the steering wheel while smoking or drinking, the behavior type does not appear as smoking or drinking. The behavior type is determined when the driver is smoking or drinking, and the steering wheel cannot be held at this time. Table 1 may vary depending on the behavior type implemented in an embodiment and on a determination criterion.

In operation S22, optimal control is performed to allow the quadratic function, including the convex quadratic form of the torque of the joint of the driver and the contact force, to be minimized to follow the three-dimensional coordinates of the keypoints measured in operation S10. The detection device calculates a contact force applied to the steering wheel by the driver's hand.

The optimal control in the present disclosure is performed such that, when a position of a body part of a human, i.e., a driver or person, is given according to a sampled time. When the body needs to move to follow a path, a person applies a torque to a joint to implement the motion or supports a fixed object or parts in the vehicle with their hands and as a result receives a reaction force. Thus, among many motions, a cost function for deriving a motion that requires less joint torque and less contact force is applied in the form of a convex quadratic form. Also, a force applied to the steering wheel is estimated in the driver dynamics model from the cost function.

In operation S24, an average of the contact force applied by the driver's hand to the steering wheel during a specific time interval is calculated for robustness of determination. When the average of the applied contact force is greater than or equal to a threshold, it is determined that the hand is holding the steering wheel. When the average does not exceed the threshold, it is determined that the hand is not holding the steering wheel.

The operating mechanism and method of operation of FIG. 3 is performed on each of a left hand and a right hand of the driver. According to the result of operation S26, the operating mechanism may distinguish both hands-off, one hand-off, or hands-on, as necessary.

Figure 4:
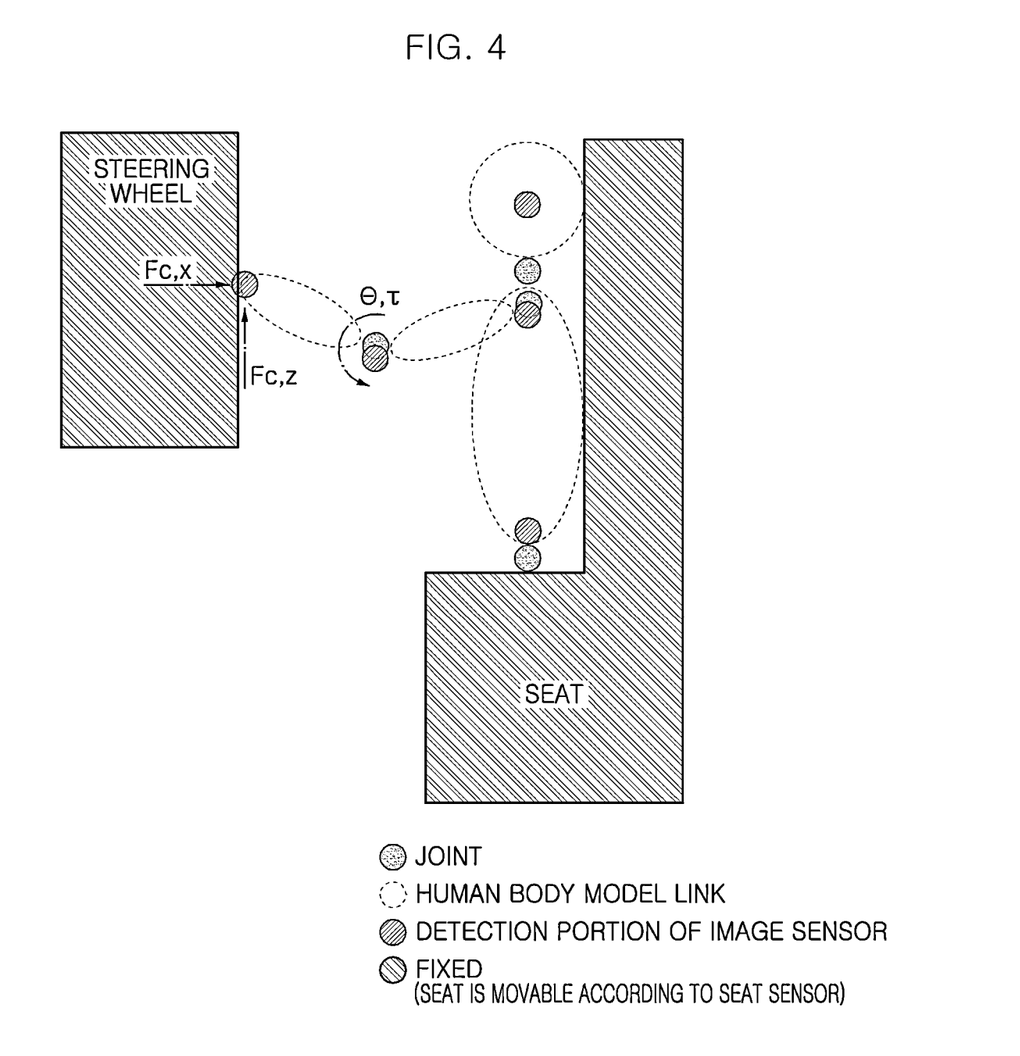
FIG. 4 is a conceptual diagram illustrating a driver dynamics model applied to the present disclosure.

FIG. 4 is a conceptual diagram illustrating a driver dynamics model. In robotics, a body dynamics model has been extensively studied in the field of motion capture that controls humanoid robots or measures a human motion. The driver dynamics model consists of links and joints. A length and a mass distribution of each link is determined by a size of the driver measured from the camera. However, since a weight of the driver in the vehicle cannot be measured and the dynamic sensor may measure only acceleration, a normalized and pre-input value is used instead of an actual mass or force.

FIG. 4 shows one example of implementation of the driver dynamics model and illustrates a simplified model in an x-z plane in order to detect steering wheel hands-on/off in a straight driving condition in which a steering wheel torque input is small. A length direction of the vehicle is indicated as an x-axis and a vertical direction of the vehicle is indicated as a z-axis.

The driver dynamics model of FIG. 4 shows joints, human body model links distinguished by the joints, camera detection portions located at the joints, and the human body model links. The camera detection portions are represented by body keypoints detected from the vehicle interior camera 10, and examples of the body keypoints include the head, shoulder, elbow, wrist, and pelvis of the driver dynamics model.

A relationship between the dynamic sensor 31 and the driver dynamics model is as follows.

The driver dynamics model is estimated or controlled in a non-inertial coordinate system of a vehicle. Thus, the dynamic sensor 31 is required in order to calculate a gravitational force and an inertial force, which are applied to the driver. In other words, the driver dynamics model is estimated or controlled by the gravitational force and the inertial force from the dynamic sensor 31. In this case, considering even a centrifugal force for the inertial force, an angular velocity sensor may be added as the dynamic sensor 31.

Meanwhile, the driver receives an inertial force according to rapid deceleration/acceleration of the vehicle. It is premised on a logical basis that the driver inevitably holds the steering wheel in order to follow the driver's motion observed by the camera in the vehicle.

According to the present disclosure, a three-dimensional position of a keypoint of the driver is estimated using the camera 10. A depth sensor such as an interior radar or a time-of-flight (TOF) camera may be used.

Figure 5:
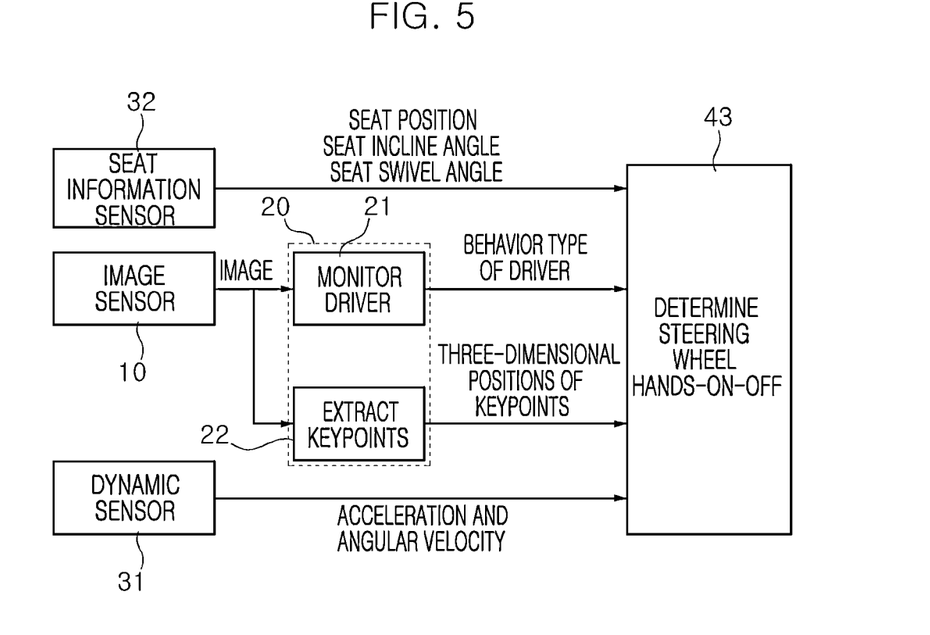
FIG. 5 is a diagram illustrating another embodiment of the present disclosure.

FIG. 5 shows another embodiment of the present disclosure. This embodiment may be applied under the logic that, when a person does not lean forward in the case of a person's hand being simply in the vicinity of the steering wheel and the vehicle is rapidly decelerating without optimal control, the person cannot resist the inertia without holding the steering wheel.

The present disclosure relates to a steering wheel hands-on/off detection device and method, which detect a steering wheel hands-on/off condition through inference from motion dynamics using an interior camera and a vehicle internal information sensor without using a contact sensor. Thus, hands-on/off detection can be achieved even in a straight driving section or situation with less steering wheel manipulation. Thus, when the steering wheel hands-on/off detection device and the method thereof are used in combination with the related art, more robust detection can be achieved. In addition, compared to hands-on/off detection using motion capture, the steering wheel hands-on/off detection device and the method thereof as disclosed herein operate even when the steering wheel is not included in an angle of view of a camera. Thus, camera selection and installation or placement are freer, i.e., more options may be available.

While the technical concept and embodiments of the present disclosure have been described with reference to the accompanying drawings, it should be apparent to those of ordinary skill in the art that various changes and modifications can be made without departing from the spirit and scope of the present disclosure without being limited to the embodiments disclosed herein. Accordingly, it should be noted that such alternations or modifications fall within the claims of the present disclosure and that the scope of the present disclosure should be construed on the basis of the appended claims.

What is claimed is:

1. A steering wheel hands-on/off detection device, comprising:
   an imaging part provided in a vehicle and configured to capture a motion of a driver;
   a dynamic sensor configured to measure a dynamic motion of the vehicle; and
   an image processor configured to process an image obtained from the imaging part, wherein
   the image processor includes a keypoint extraction part configured to extract keypoints of the driver, and
   an optimal torque and an optimal contact force are applied to the keypoints of the driver so that a driver dynamics model following a position of the driver is applied; and
   a vehicle safety controller configured to determine steering wheel hands-on/off based on the driver dynamics model and a magnitude of a force applied to the steering wheel, which is estimated from the dynamic sensor.

2. The steering wheel hands-on/off detection device of claim 1, further comprising:
   a seat sensor assembly configured to measure information on at least one seat among a seat position in the vehicle, a seat incline angle, and a seat swivel angle,
   wherein the seat information is added to the driver dynamics model of the vehicle safety controller.

3. The steering wheel hands-on/off detection device of claim 1, wherein a cost function in a convex quadratic form, which receives a joint torque and a contact force as inputs and receives the optimal torque and the optimal contact force, which are applied to the keypoints of the driver, is used for optimal control of the driver dynamics model of the vehicle safety controller.

4. The steering wheel hands-on/off detection device of claim 1, wherein:
the image processor further includes a driver monitoring part configured to derive a behavior type of the driver from the image; and
when the behavior type of the driver is a behavior type in which one hand of the driver corresponds to steering wheel hands-off, the driver monitoring part updates the driver dynamics model of the vehicle safety controller as another hand of the driver comes into contact with the steering wheel.

5. The steering wheel hands-on/off detection device of claim 4, wherein, when the force applied to the steering wheel estimated from the driver dynamics model is greater than or equal to a threshold, it is determined that the driver is holding the steering wheel.

6. A steering wheel hands-on/off detection device, comprising:
an imaging part provided in a vehicle and configured to capture a motion of a driver;
a dynamic sensor configured to measure a dynamics motion of the vehicle; and
an image processor configured to process an image obtained from the imaging part, wherein the image processor includes a driver monitoring part configured to derive a behavior type of the driver from the image, and a keypoint extraction part configured to extract keypoints of the driver; and
a vehicle safety controller configured to determine steering wheel hands-on/off from a driver dynamics model which is set from a behavior type and the key points of the driver.

7. A steering wheel hands-on/off detection device, comprising:
an imaging part provided in a vehicle and configured to capture a motion of a driver;
a dynamic sensor configured to measure a dynamic motion of the vehicle;
an image processor configured to process an image obtained from the imaging part, wherein the image processor includes a driver monitoring part configured to derive a behavior type of the driver from the image, and a keypoint extraction part configured to extract keypoints of the driver; and
a vehicle safety controller configured to determine steering wheel hands-on/off by predicting a motion of the driver through optimal control to allow the driver dynamics model, which is set from the behavior type and the keypoints of the driver, to follow a position of the driver.

8. A method of detecting steering wheel hands-on/off, the method comprising:
extracting, by an image processor, a behavior type and keypoint coordinates of a driver from an image acquired from an imaging part in a vehicle;
determining whether the driver has a behavior type capable of holding a steering wheel;
determining whether a hand of the driver is within a predetermined distance from the steering wheel;
adding a steering wheel contact condition to a constraint condition of a driver dynamics model of a vehicle safety controller;
estimating a force applied to the steering wheel from the driver dynamics model through optimal control; and
determining steering wheel hands-on/off by predicting a motion of the driver through the optimal control to allow the driver dynamics model, which is set from the behavior type and the keypoints of the driver, to follow a position of the driver.

9. The method of claim 8, wherein, in determining steering wheel hands-on/off, when the force applied to the steering wheel is greater than or equal to a threshold for a specific time interval, the driver is determined as holding the steering wheel.

10. The method of claim 8, further comprising:
before estimating the force applied to the steering wheel through the optimal control, adding a seat constraint condition from a seat sensor assembly.

11. The method of claim 10, wherein one or more among a seat position, a seat incline angle, or a seat swivel angle from the seat sensor assembly are added to a constraint condition of the driver dynamics model.

12. The method of claim 8, further comprising:
when the behavior type of the driver is determined not to be a behavior type in which the driver is capable of holding the steering wheel, adding one or more among a seat position, a seat incline angle, or a seat swivel angle from the seat sensor assembly to a constraint condition of the driver dynamics model without adding the steering wheel contact condition of the driver.

13. The method of claim 8, further comprising:
when the hand of the driver is not within a predetermined distance from the steering wheel, adding one or more among a seat position, a seat incline angle, or a seat swivel angle from the seat sensor assembly to a constraint condition of the driver dynamics model without adding the steering wheel contact condition of the driver.

* * * * *